G. Stackhouse,
Comb.

No. 91,984. Patented June 29, 1869.

Witnesses:
John F. Brooks
George W. Mabee

Inventor:
G. Stackhouse
per Munn & Co.
attorneys

United States Patent Office.

GEORGE STACKHOUSE, OF MOUNT WASHINGTON, PENNSYLVANIA.

Letters Patent No. 91,984, dated June 29, 1869.

IMPROVEMENT IN ATTACHMENT FOR COMBS.

The Schedule referred to in these Letters Patent and making part of the same.

*To all whom it may concern:*

Be it known that I, GEORGE STACKHOUSE, of Mount Washington, in the county of Allegheny, and State of Pennsylvania, have invented a new and improved Comb-Attachment; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
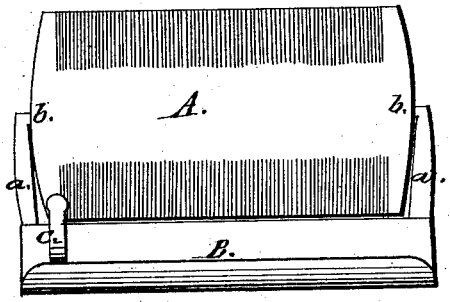
Figure 1 represents a front, or face view of my improved comb-attachment.

This invention relates to a new attachment to fine combs, and has for its object to arrest and retain all dirt, insects, and other matter dropping off the comb, so as to prevent the soiling of clothes and the escape of parasites that may have been caught.

The invention consists in pivoting a trough to the comb, said trough being out of the way during the combing-process, but swinging under the teeth of the comb as soon as the same is taken off the head.

This invention will be particularly useful for children, and can be cheaply made, and readily applied.

A, in the drawing, represents a fine comb, of ordinary or suitable form and size.

B is a sheet-metal trough, made somewhat longer than the comb, and open at one or both ends.

From the ends of the trough project arms, $a\,a$, which carry pins, $b\,b$, that can be fitted into small holes formed at the ends of the comb, in the middle of the same, as indicated in fig. 1. The trough is thus suspended from the comb, and can swing on the pivots $b$.

The trough has one projecting arm, $c$, in front of the comb, said arm keeping the comb-edge over the trough when the comb is not used on the head.

Figure 2:
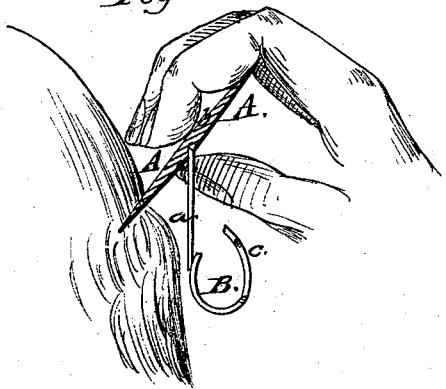
Figure 2 is an end, or edge view of the same.

While the comb is used, the trough will not be under its edge, but will follow loose on the head, as indicated in fig. 2. But as soon as the comb is taken off the head, the trough will, by its gravity, be caused to swing under the edge of the comb, until it is arrested by the arm $c$, and all matter dropping off the comb will then be caught in the trough.

Having thus described my invention,

I claim as new, and desire to secure by Letters Patent—

A comb-attachment, consisting of the swinging trough B, substantially as herein shown and described, to operate as set forth.

The above specification of my invention signed by me, this 26th day of January, 1869.

GEORGE STACKHOUSE.

Witnesses:
J. DONALDSON,
JOHN SMITH.